United States Patent
Karlsson

(10) Patent No.: US 7,340,896 B2
(45) Date of Patent: Mar. 11, 2008

(54) METHOD FOR REGULATING THE TURBINE POWER OF A TURBO IN AN INTERNAL COMBUSTION ENGINE

(75) Inventor: Erik Karlsson, Stockholm (SE)

(73) Assignee: SAAB Automobile AB (SE)

( * ) Notice: Subject to any disclaimer, the term of this patent is extended or adjusted under 35 U.S.C. 154(b) by 112 days.

(21) Appl. No.: 11/301,411

(22) Filed: Dec. 13, 2005

(65) Prior Publication Data
US 2006/0137344 A1 Jun. 29, 2006

(30) Foreign Application Priority Data
Dec. 16, 2004 (SE) .................... 0403053

(51) Int. Cl.
F02D 23/00 (2006.01)
(52) U.S. Cl. ..................................... 60/602
(58) Field of Classification Search ............. 60/602
See application file for complete search history.

(56) References Cited

U.S. PATENT DOCUMENTS

| 4,745,753 | A | * | 5/1988 | Tadokoro et al. ............. 60/602 |
| 4,765,141 | A | * | 8/1988 | Hirabayashi .................. 60/602 |
| 5,996,347 | A | * | 12/1999 | Nagae et al. ................. 60/602 |
| 6,314,735 | B1 | * | 11/2001 | Kolmanovsky et al. ....... 60/602 |
| 6,467,270 | B2 | * | 10/2002 | Mulloy et al. ............. 60/605.2 |
| 6,729,134 | B2 | * | 5/2004 | Arnold et al. ................ 60/602 |
| 7,168,408 | B2 | * | 1/2007 | Toda ........................ 123/196 S |
| 2001/0032465 | A1 | * | 10/2001 | Terry et al. .................... 60/602 |
| 2006/0037317 | A1 | * | 2/2006 | Leavesley ..................... 60/602 |
| 2007/0033938 | A1 | * | 2/2007 | Ueno ........................... 60/612 |

FOREIGN PATENT DOCUMENTS

JP          09053457 A   *   2/1997

* cited by examiner

Primary Examiner—Thomas Denion
Assistant Examiner—Mary A Davis
(74) Attorney, Agent, or Firm—Ostrolenk, Faber, Gerb & Soffen, LLP

(57) ABSTRACT

A method for regulating the turbine power of a turbo in an internal combustion engine. The internal combustion engine comprises an exhaust-driven turbine with guide elements for guiding the exhaust gas flow to the turbine wheel, the orientation of the guide elements around respective axes thereof parallel to the axis of the turbine are adjustable within a range defined by a first end position (A) and a second end position (C) for the purpose of regulating the quantity of exhaust gases through the turbine. For a medium to large exhaust gas flow, the guide elements are adjusted into a guide element position (F) which lies within a subrange (D, E) of the range (A, C), which subrange (D, E) includes at least one guide element position with a higher turbine efficiency than the guide element positions outside the subrange have, and exhaust gases which are regarded as superfluous when the guide elements have been adjusted into the guide element position (F) are bypassed past the turbine in order for it to be possible for desired turbine power to be obtained.

10 Claims, 4 Drawing Sheets

_METHOD FOR REGULATING THE TURBINE POWER OF A TURBO IN AN INTERNAL COMBUSTION ENGINE_

TECHNICAL FIELD OF THE INVENTION

The present invention relates to a method for regulating the turbine power of a turbo in an internal combustion engine and particularly to controlling action of guiding elements for exhaust gas flow.

BACKGROUND OF THE INVENTION

In order to increase the degree of filling in an ordinary aspirating engine, it can be provided with a turbocharger in order that the energy available in the exhaust gases, which would otherwise go to waste, can be better utilized. The exhaust gases are conducted through a turbine part for rotation of a turbine wheel. An impeller, which is in turn arranged in a compressor part for supercharging the air which is supplied to the engine, is mounted on the same shaft as the turbine wheel. A limitation of this type of turbocharger is that it can normally deliver the desired charging pressure only within a narrow speed and load range.

One type of turbocharger which solves this problem is known as a VGT (Variable Geometry Turbine) turbocharger, that is a turbine with adjustable geometry. With such a turbocharger, it is possible to widen this speed and load range by virtue of the geometry of the turbine part being adaptable for both small and large exhaust gas flows. A variant of the VGT, the Variable Nozzle Turbine (VNT) has continuously adjustable guide elements. With the aid of these, the exhaust gases can be directed towards the turbine wheel at different angles as a function of the prevailing exhaust gas flows. Broader turbine matching is thus obtained, and the desired charging pressure can be achieved for a wider speed and load range.

However, a high degree of turbine matching involves a compromise between on the one hand utilizing the small exhaust gas flows which are available at part load and low speeds and on the other hand handling the considerably larger exhaust gas flows which result at full load and high speeds.

For a VNT with adjustable guide elements, this means that the guide elements can be positioned so that the rate through the turbine is maximized for low exhaust gas flows. With this positioning of the guide elements, however, the exhaust gases will strike the turbine wheel relatively tangentially, which is not entirely optimum as far as force transmission is concerned. The consequence is poor utilization of the exhaust gases and thus impaired turbine efficiency. The opposite case arises with very large exhaust gas flows as the turbine power has to be limited and the guide elements occupy a diametrally opposite position in this case. However, the exhaust gases will strike the turbine wheel essentially radially, which is not favorable either as far as force transmission is concerned and also results in impaired turbine efficiency.

There are on the whole two methods for regulating this type of turbine. The first method is based on controlling the turbine power exclusively by adjusting the position of the guide elements. This requires a relatively high degree of turbine matching and as a rule results in poor torque and response at low speeds because it has to be possible to cater for a large speed and load range.

The second method is based on the turbine power being controlled not only by the position of the guide elements but also with the aid of some type of bypass arrangement, what is known as a waste gate. This means that any exhaust gas surplus, at full load and high speeds, when the guide elements already occupy the position intended for maximum exhaust gas flows, is ventilated out via the bypass arrangement. However, this regulating method represents poor utilization of the energy available in the exhaust gases because the turbine works with impaired efficiency.

OBJECT OF THE INVENTION

One object of the present invention is therefore better to utilize the energy available in the exhaust gases.

Another object is to increase the efficiency of the internal combustion engine.

A further object is to reduce the fuel consumption of the internal combustion engine.

SUMMARY OF THE INVENTION

These and other objects are achieved with a method as defined in the introduction and with features according to the invention. The invention concerns a method for regulating the turbine power of a turbo in an internal combustion engine. The internal combustion engine comprises an exhaust-driven turbine with guide elements for guiding the exhaust gas flow to the turbine wheel, the orientation of the guide elements around respective axes thereof parallel to the axis of the turbine are adjustable within a range defined by a first end position (A) and a second end position (C) for the purpose of regulating the quantity of exhaust gases through the turbine. For a medium to large exhaust gas flow, the guide elements are adjusted into a guide element position (F) which lies within a subrange (D, E) of the range (A, C), which subrange (D, E) includes at least one guide element position with a higher turbine efficiency than the guide element positions outside the subrange have, and exhaust gases which are regarded as superfluous when the guide elements have been adjusted into the guide element position (F) are bypassed past the turbine in order for it to be possible for desired turbine power to be obtained.

When a guide element position within the subrange is selected, the turbine will work within a range with a higher efficiency than it would have done if a guide element position lying outside the subrange had been selected. In this selected guide element position, the turbine will deliver higher power owing to the increased efficiency. With this, the quantity of exhaust gases bypassing the turbine has to increase in order to compensate for this increased efficiency because the same load requirements are still to be satisfied. This bypassing also results in the pressure upstream of the turbine decreasing, which leads to a reduction in the pumping losses of the engine. This in turn results in the engine having to deliver less power in order to overcome these pumping losses. The air mass which the compressor has to deliver to the internal combustion engine is consequently also reduced, as is thus its specific fuel consumption.

The subrange is preferably defined by a third end position and a fourth end position, the guide element position which corresponds to maximum efficiency of the turbine being included in the subrange; and all the guide element positions within the subrange suitably have a higher turbine efficiency than the guide element positions outside the subrange; and, more preferably, all the guide element positions within the subrange have a considerably higher turbine efficiency than the first and second end positions. By virtue of this, the turbine can work more effectively when there is a medium to large exhaust gas flow so that the overall efficiency of the engine can be kept at a high level.

The third end position (D) suitably coincides with the guide element position (B). By virtue of this, the guide elements can be adjusted within a narrower subrange while retaining high turbine efficiency.

The guide element position is preferably selected as a function of the pressure upstream of the turbine, and the guide element position is suitably the position which minimizes the pressure upstream of the turbine at a given medium to large exhaust gas flow. By virtue of this, a simple and effective way of determining the adjustment position of the guide elements is obtained, and the efficiency of the turbine and the internal combustion engine can moreover be maximized.

The guide elements are suitably adjusted, when there is a small exhaust gas flow, into a guide element position outside the subrange, between the first end position and the third end position; and the guide elements are preferably adjusted, when there is a very large exhaust gas flow, into a guide element position outside the subrange, between the fourth end position and the second end position. By virtue of this, the turbine can be regulated within a wider load and speed range when the need exists.

Other features and advantages of the present invention will become apparent from the following description of the invention which refers to the accompanying drawings.

BRIEF DESCRIPTION OF THE FIGURES

The present invention will now be described with reference to accompanying figures, in which.

DETAILED DESCRIPTION OF THE INVENTION

Figure 1:
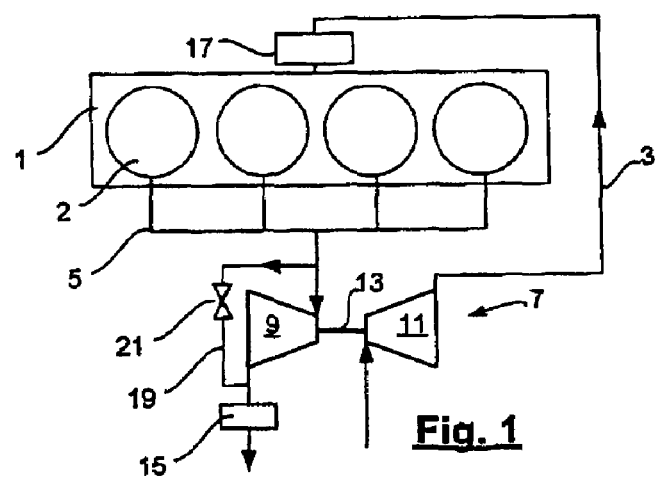
FIG. 1 shows a diagrammatic representation of an internal combustion engine provided with an exhaust-driven turbine to which the regulating method according to the invention is to be applied.

FIG. 1 shows a diagrammatic representation of an internal combustion engine 1 to which the regulating method according to the invention is to be applied. The internal combustion engine 1, which can be an SI or a CI engine, comprises four cylinders 2, which are in flow-communication with an induction system 3 and an exhaust manifold 5. A turbo unit 7, which comprises an exhaust-driven turbine 9 and a compressor 11, where the compressor is coupled to the exhaust-driven turbine via a turbine shaft 13, is connected to the internal combustion engine. The exhaust-driven turbine 9 is connected to and in flow-communication with the exhaust manifold 5, and a catalyst 15 is arranged downstream of the turbine 9. The compressor 11 is in turn connected to and in flow-communication with the induction system 3, in which a charge air cooler 17 is also arranged for cooling charge air conveyed to the cylinders. A bypass line 19 connects the exhaust manifold 5 upstream of the turbine to that part of the exhaust system located downstream of the turbine 9. A valve 21, what is known as a waste gate valve, is arranged in the bypass arrangement 19 so as to be capable of opening and closing in order to conduct surplus exhaust gases past the turbine if the turbine power has to be limited.

Figure 2A:
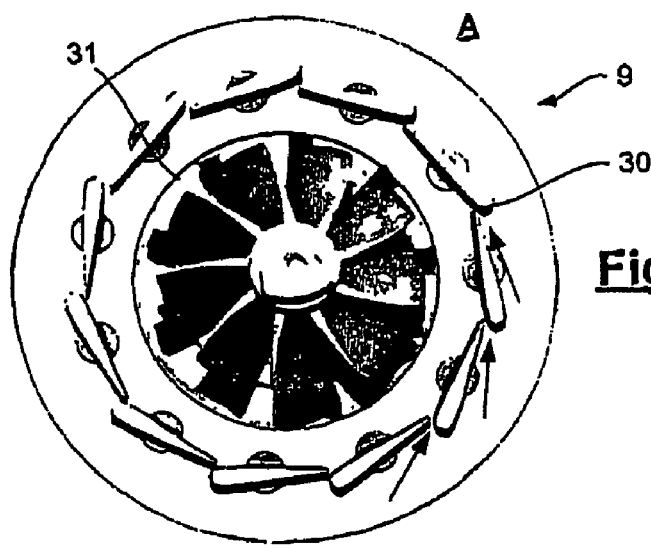
FIGS. 2a-c show the guide elements in the turbine housing and their position in different settings.
Figure 2B:
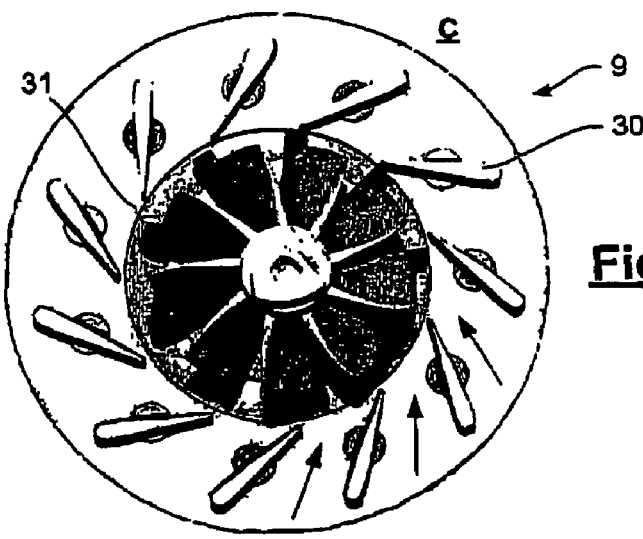
Figure 2C:
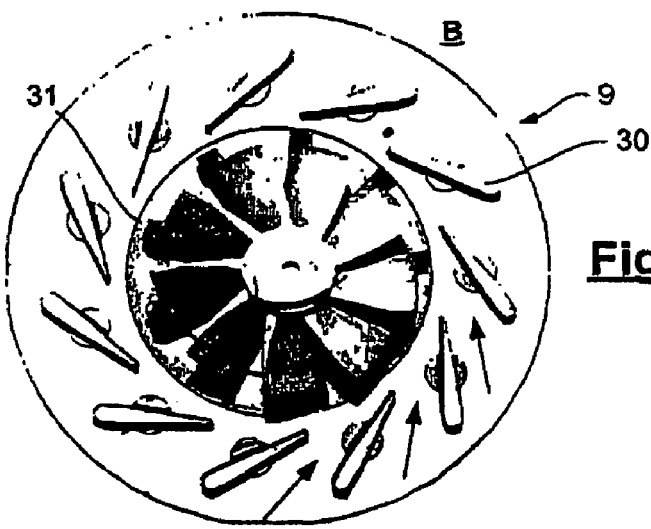

FIGS. 2a-c show parts of the turbine, what is known as a VNT (Variable Nozzle Turbine), which is previously known. This comprises a number of (usually 10-14) continuously adjustable guide elements 30, usually in the form of rotatable guide blades 30 arranged in a ring shape. As illustrated, the turbine has an axis and each guide element 30 has a respective rotation axis parallel to the turbine axis, and the guide elements are rotatable around their axes for the adjustments. With the aid of these guide blades, both the angle of incidence of the exhaust gases in towards the turbine wheel 31 (see the arrows) and the A/R ratio of the turbine, that is to say the ratio between the area and the radius of the turbine housing, can be varied. The guide blades 30 can occupy different guide element positions within a range which is defined by a first, almost closed end position A and a second, almost completely open end position C (see FIG. 2a and FIG. 2b respectively). The first end position A has a low A/R ratio value and allows an angle of incidence of the exhaust gases which is essentially tangential in towards the turbine wheel 31 and is intended for small exhaust gas volumes. The second end position C has a high A/R ratio value and allows an angle of incidence of the exhaust gases which is essentially radial in towards the turbine wheel 31 and is intended for large exhaust gas volumes. Between the first and second end positions, the guide blades 30 can be adjusted continuously into an arbitrary number of positions, so that sufficient turbine power can be delivered to the compressor 11 depending on the specific load and speed requirements which exist.

Figure 3:
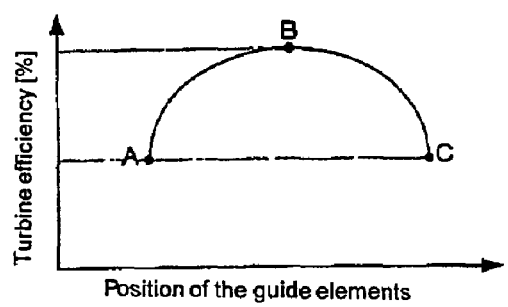
FIG. 3 shows a diagrammatic representation of the efficiency of a turbine with adjustable guide elements as a function of the position of the guide elements, intended to illustrate the regulating principle according to the prior art.

FIG. 3 shows a diagrammatic representation of how the efficiency of a VNT turbo varies as a function of the position of the guide blades. The point A indicates the first end position of the guide blades (see also FIG. 2a). In this first end position A, it is true that the rate through the turbine 9 can, when there are small exhaust gas flows, be kept high owing to the low A/R ratio, but the exhaust gases will strike the turbine wheel 31 relatively tangentially. This represents poor utilization of the exhaust gases and thus impaired turbine efficiency, which is also indicated by a corresponding position on the vertical axis. The point C indicates the second end position of the guide blades 30 (see also FIG. 2b). In this second end position C, it is true that, owing to the high A/R ratio, the rate through the turbine 9 can be kept at an acceptable level when there are large gas flows. However, the exhaust gases will strike the turbine wheel 31 essentially radially, which is not favorable either as far as force transmission is concerned. This also results in impaired turbine efficiency, which is also indicated by a corresponding point on the vertical axis. Between these two end positions, there is a position B of the guide elements 30 when the exhaust gases strike the turbine wheel 31 with an optimum angle of incidence and where the efficiency of the turbine 9 will be maximized (see also FIG. 2c).

For regulating this VNT according to the prior art, the position of the guide blades 30 is adapted according to the exhaust gas flow concerned, which exhaust gas flow is in proportion to the load and speed level which exists, so that the turbine power required in order to achieve the desired degree of supercharging can be generated. The position of the guide elements will therefore vary within the range, between the first end position A and the second end position C. When there are large exhaust gas flows, for example with both high loads and speeds, the guide blades will occupy the second end position C and any exhaust gas surplus will be conducted past the turbine via the bypass line 19 in order that too high a turbine power is avoided.

In contrast to this regulating method, the invention proposes that, for a medium to large exhaust gas flow, the position of the guide elements 30 is adjusted within a subrange of the range defined by the first and the second end positions A, C (see FIG. 4a), in combination with any exhaust gas surplus being conducted past the turbine 9 via the bypass line 19. This subrange is defined by a third end position D and a fourth end position E. The difference is that the turbine 9 will work within a range which represents a considerably higher efficiency of the turbine 9 than positions outside the subrange D, E. FIG. 4b shows this regulating principle, which is intended for medium to large exhaust gas flows. According to this regulating method, the position of the guide elements 30 is controlled as a function of the pressure which prevails upstream of the turbine, the guide element position which generates a minimum pressure upstream of the turbine 9 being regarded as optimum. This means that the guide elements 30 will be adjusted so that they occupy a guide element position within the subrange D, E which results in a low pressure upstream of the turbine 9 and in which position the desired turbine power for the compressor 11 is ensured, in combination with any exhaust gas surplus being ventilated out via the bypass line 19.

Figure 4A:
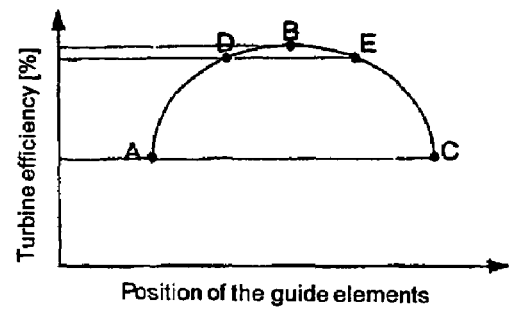
FIGS. 4a-c show a diagrammatic representation of the efficiency of a turbine with adjustable guide elements as a function of the position of the guide elements, intended to illustrate the regulating principle according to the invention.
Figure 4B:
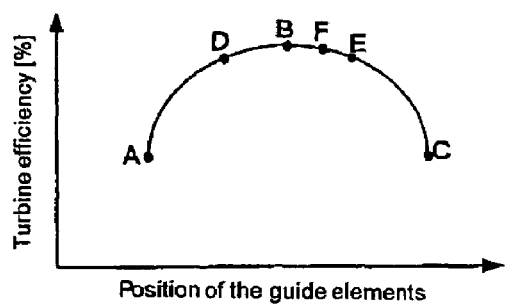

For small to medium exhaust gas flows, on the other hand, the turbine will be regulated in the usual way, that is to say the guide elements 30 will be adjusted into the position, between the first end position A and the position B which corresponds to maximum efficiency of the turbine, which generates the desired turbine power, that is to say the left half of the solid curve in FIGS. 4a-4b.

It may likewise also be desirable in some operating situations with a large to very large exhaust gas flow to adjust the guide elements 30 into a position outside the subrange, between the fourth end position E and the second end position C.

Figure 4C:
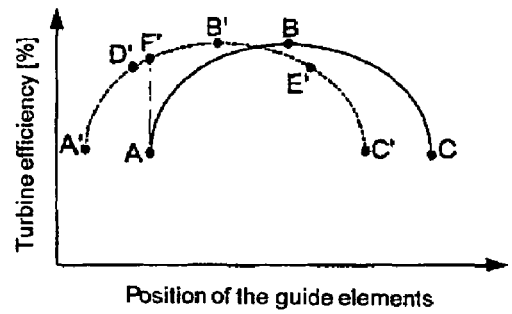

It is also conceivable to use the regulating method according to the invention for small to medium exhaust gas flows as well. However, this requires a different, smaller turbine with a different characteristic and means that the curve shown in FIG. 4c, which is specific to a given turbine, shifts to the left (see broken curve). It is then possible instead, when there are very small exhaust gas flows, for example, which would normally correspond to adjusting the guide elements into the first end position A, to set the guide elements in a guide element position F', for example, which lies within the subrange D', E' and to conduct the exhaust gas surplus past the turbine 9 via the bypass line 19.

EXAMPLE OF REGULATING METHOD ACCORDING TO THE INVENTION

FIGS. 5a-d show a test carried out on an L850, 2.0 1 Otto engine and intended to illustrate the principle and advantages of the regulating method according to the invention. The test was carried out by keeping the engine speed and load constant throughout the test, while the positions of the guide elements and the degree of opening of the bypass arrangement, that is to say the waste gate valve, were varied. The test applies to a given engine load requirement, that is to say the engine is intended to deliver a given torque at a given speed. In a corresponding way, tests which correspond to other engine load requirements could be carried out with similar results as a consequence.

Figure 5A:
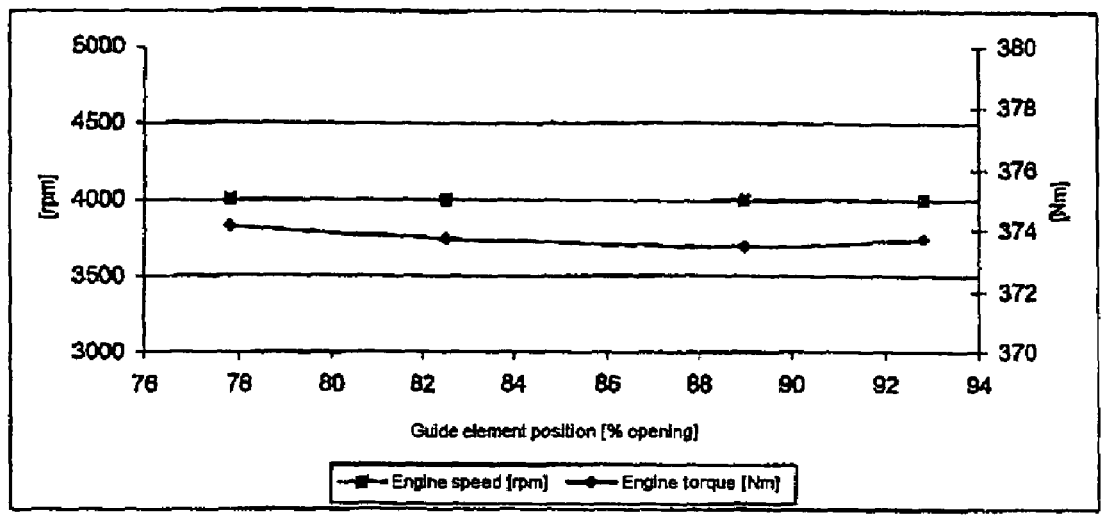
FIGS. 5a-d show graphs of a test carried out for an internal combustion engine working at constant load and speed.

FIG. 5a shows a diagram which represents the engine speed and the engine torque as a function of the position of the guide elements. The position of the guide elements is graduated on the horizontal axis between 0 and 100%. 0% corresponds to the first end position A of the guide elements, that is to say a position adapted to very small exhaust gas flows, while 100% corresponds to the second end position C, that is to say a position adapted to very large exhaust gas flows. The position of the guide elements is shown between 76% and 94% in the diagram in FIG. 5a. The left vertical axis represents the engine speed (rpm), and the right vertical axis represents the torque of the engine (Nm). The test was carried out by the guide elements being adjusted into almost completely open position, roughly 93% open, at the beginning of the test. The engine was then run at high load with a torque of roughly 370 Nm at a constant speed of 4000 rpm.

Figure 5B:
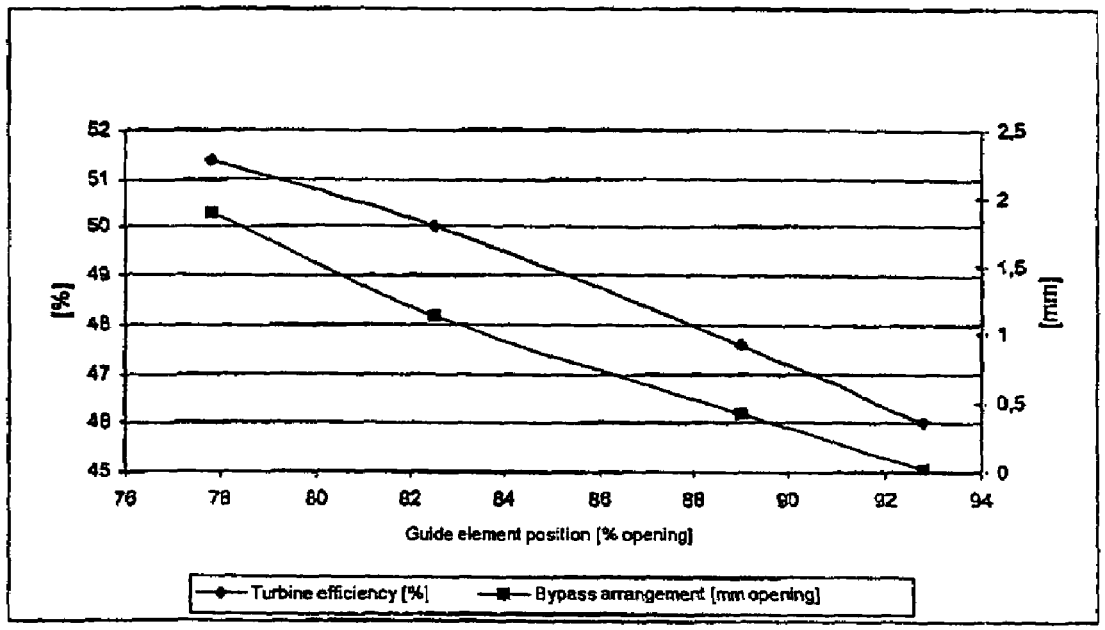

FIG. 5b shows a diagram which represents the turbine efficiency and the degree of opening of the bypass arrangement as a function of the position of the guide elements (the horizontal axis). The left vertical axis represents the turbine efficiency (%), and the right vertical axis represents the degree of opening (mm) of the bypass arrangement, that is the opening of the waste gate valve. At 93%, which is the position the guide elements are in when the test starts, the turbocharger has to deliver a given turbine power in order for the compressor to be capable of delivering the air mass and charging pressure which are required for the engine to be capable of delivering the given torque (370 Nm). In the case in question, the bypass arrangement is almost completely closed at 93%, and the efficiency of the turbine is at the 46% point. If the position of the guide elements is changed so that they move towards the first end position, the turbine efficiency will increase (for reasons explained above). In order that the engine will deliver the same torque in this position as previously, the bypass arrangement 19 has to open more in order to compensate for this increased turbine efficiency. This is illustrated by a movement to the left of the respective curve in the diagram.

Figure 5C:
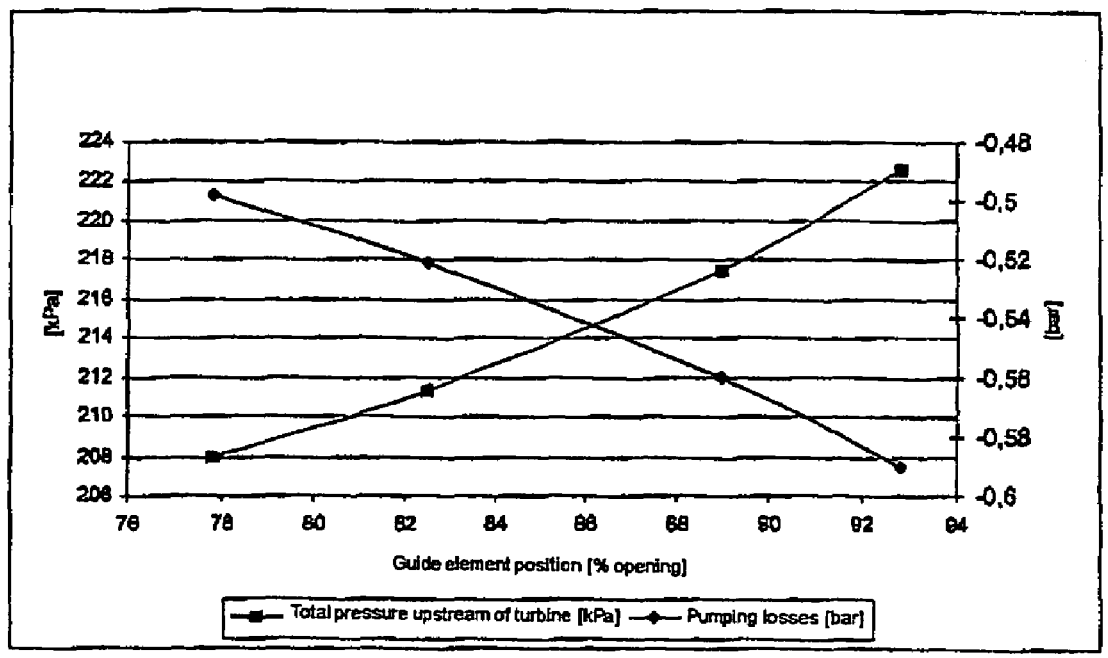

FIG. 5c shows a diagram which represents the total pressure and the pumping losses as a function of the position of the guide elements (the horizontal axis). The left vertical axis represents the total pressure (kPa), and the right vertical axis represents the pumping losses (bar). The pressure in the exhaust manifold 5 falls now, partly because the valve 21 in the bypass arrangement 19 opens more and more, because the turbine efficiency improves, which provides better aspiration, and also because the engine requires a smaller degree of supercharging in order to be capable of delivering the same torque, which means that the engine does not have to deliver the same power to the turbine 9. The pumping losses in the engine are therefore reduced.

Figure 5D:
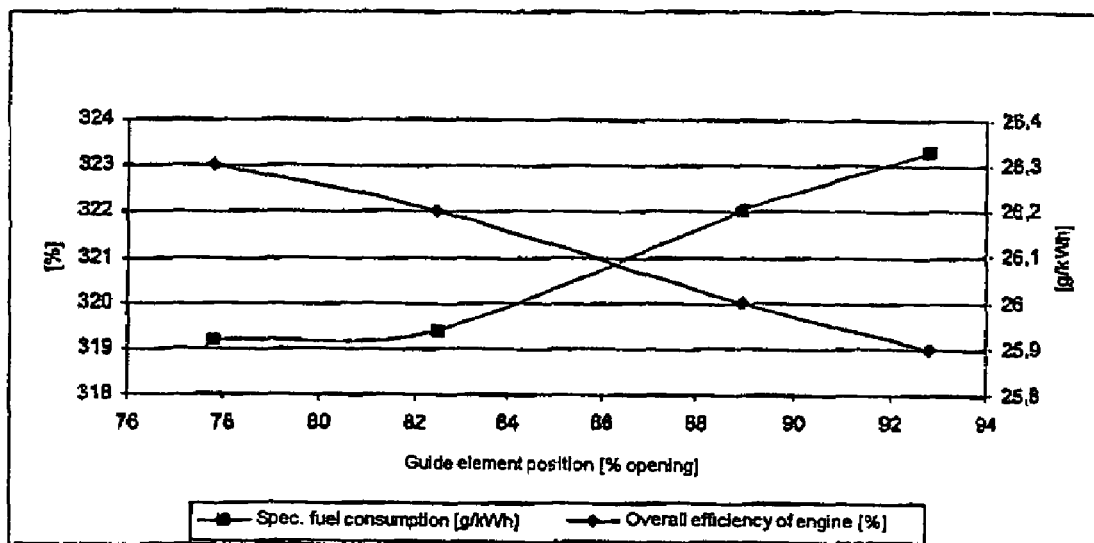

FIG. 5d shows a diagram which represents the overall efficiency of the engine and the specific fuel consumption as a function of the position of the guide elements (the horizontal axis). The left vertical axis represents the overall efficiency (%) of the engine, and the right vertical axis represents the specific fuel consumption (g/kWh). The result of the pumping losses being reduced is that the air mass for the engine is reduced and with it also the fuel quantity to be mixed with the air in order for the engine to provide the desired torque. Moreover, the exhaust gas mass is reduced, which means that the engine has to work less to be capable of driving turbine and compressor.

This type of strategy functions as long as sufficient power is obtainable from the turbine. After the guide elements 30 have reached a position which corresponds to 50%, the efficiency of the turbine 9 will decrease again.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for efficiently regulating turbine power of a turbo in an internal combustion engine, wherein the internal combustion engine comprises an exhaust-driven turbine including guide elements for guiding an exhaust gas flow to a turbine wheel, the guide elements being adjustable to a first position wherein the guide elements are in the fully closed position (A) and a second position (C) wherein the guide elements are in the fully opened position, through a range of positions defined by and between the first position (A) and the second position (C) for the purpose of regulating the quantity of exhaust gases through the turbine, the method comprising:

when there is a medium to large exhaust gas flow:

defining a range wherein the guide elements are adjustable into a third position (D) wherein the guide elements are between the first and second positions (A,C), and a fourth position (E) wherein the guide elements are between the third and second position (D,C);

adjusting the guide elements into a fifth guide element position (F) which lies within a subrange, wherein the subrange comprises the guide elements being between the third and fourth positions (D,E) and includes at least one guide element position having a higher turbine efficiency than the guide element positions between the first and third positions (A,D) and between the fourth and second positions (E,C) wherein the adjustment produces superfluous exhaust gases;

bypassing the superfluous exhaust gases past the turbine to enable a desired turbine power to be obtained.

2. The method according to claim 1, wherein the turbine has a rotation axis and each of the guide elements is rotatable around a respective axis parallel to the turbine axis for the adjustment of the guide elements within the range.

3. The method according to claim 1, wherein a sixth guide element position (B) which corresponds to maximum efficiency of the turbine being included in the subrange.

4. The method according to claim 3, wherein all the guide element positions within the subrange (D, E) have a higher turbine efficiency than the guide element positions outside the subrange and between the first and third positions (A,D) and the second and fourth positions (C,E).

5. The method according to claim 4, wherein all the guide element positions within the subrange (D,E) have a considerably higher turbine efficiency than the first and second end positions (A,C).

6. The method according to claim 5, wherein the third end position (D) coincides with the sixth guide element position (B).

7. The method according to claim 6, further comprising selecting the fifth guide element position (F) as a function of pressure upstream of the turbine.

8. The method according to claim 7, wherein the fifth guide element position (F) is an adjustment of the guide elements which minimizes the pressure upstream of the turbine for every given medium to large exhaust gas flow.

9. The method according to claim 1, wherein when there is a small exhaust gas flow which is smaller than the medium to large gas flow, the method further comprising:

adjusting the guide elements into a guide element position outside the subrange, and between the first end position (A) and the third end position (D).

10. The method according to claim 9, wherein when there is a very large exhaust gas flow which is larger than the medium to large gas flow, the method further comprising:

adjusting the guide elements into a guide element position outside the subrange, between the fourth end position (E) and the second end position (C).

* * * * *